Patented Mar. 9, 1948

2,437,643

UNITED STATES PATENT OFFICE 2,437,643

SEPARATION OF NEUTRAL FAT FROM TALL OIL

Alfred G. Houpt, Springdale, Conn., assignor to American Cyanamid Company, New York, N. Y., a corporation of Maine No Drawing. Application May 12, 1942, Serial No. 442,695

2 Claims. (Cl. 260—97.5)

This invention relates to the separation of neutral fat, a fraction derived from black liquor soap or from talloel and consisting of unsaponifiable fat and esters of fatty acids.

Heretofore, the attempts to separate the components of black liquor soap or of talloel have included such methods as high vacuum fraction distillation, crystallization, preferential esterification and combinations of these methods. However, these attempts have been generally unsuccessful. Among the reasons to which this lack of success may be attributed were the poor yields, general lack of sharp separation of acids, corrosion of equipment, manipulation difficulties arising from the nature of the materials treated and the high cost of the methods used.

As described in application of Christmann and Houpt, Serial No. 212,516, filed June 8, 1938, Patent No. 2,285,902, of which this is a continuation-in-part, it is possible to separate the fatty acids from the rosin acids of black liquor soap by a process which includes forming a hot, substantially anhydrous solution of the rosin acids with salts of fatty acids, in an organic solvent in which the salts are soluble hot but insoluble at room temperatures, and in which the rosin acids are soluble both hot and at room temperatures, cooling the solution to precipitate the salts of the fatty acids, filtering off the precipitated salts and recovering the rosin acids from the solution and the fatty acids from the separated salts, if desired.

As more specifically set forth in Serial No. 212,516, the crude black liquor soap which may be used as the starting material is preferably treated for the removal of various impurities such as lignins and sulphur compounds by dissolving and reprecipitating the soaps from an alkaline salt solution in which the lignin and sulphur compounds remain dissolved. The purified black liquor soap may then be acidified with excess sulphuric acid and the fatty material separated as talloel containing rosin acids as well as fatty acids.

The talloel is dissolved in a suitable solvent, such as secondary amyl alcohol. Either before or after solution, the talloel is partly neutralized with sodium hydroxide or the like in an amount sufficient to combine with the fatty acids as soaps while leaving the rosin acid free. The fatty acid soaps are separated from the solvent solution of free rosin acids by dehydrating the mixture, for example, by boiling and refluxing the solvent-water azeotrope over a water trap, until the solution contains less than 1.5% by volume of removable water. Upon cooling the hot, dehydrated mixture, the salts, or soaps, of the fatty acids are precipitated while the rosin acids remain dissolved in the mother liquor.

As an alternative to the foregoing procedure, involving the preparation of talloel by complete acidification of the purified black liquor soap, this soap may be only partly acidified using 50% sulphuric acid or the like in an amount sufficient to liberate the rosin acids while leaving the fatty acids combined as soaps. This partial acidification may be accomplished prior to or after the addition of a suitable organic solvent such as secondary amyl alcohol but in any case the resulting mixture is then dehydrated in the presence of such solvent, by means such as azeotropic distillation, until it contains less than 1.5% by volume of removable water. The resulting hot and substantially dry solution containing both the fat and rosin, along with sufficient alkali to saponify the fatty acids, all dissolved in the organic solvent, may be separated at this point from the undissolved sludge of sodium sulphate and any insoluble non-fatty contaminants such as cellulosic fibers, by known methods, such as decantation or filtration. The fatty acid soaps are separated from the resulting hot organic solvent solution by cooling whereupon the salts, or soaps, of the fatty acids are precipitated while the rosin acids remain dissolved in the mother liquor, as in the procedure involving the preparation of talloel.

The solution is preferably cooled slowly in a suitable vessel equipped with a very low-speed agitator, such as one of the anchor or gate type, which will scrape the precipitated soap from the cooling surfaces of the container but which will not grind the precipitate. The temperature is allowed to fall uniformly from the dehydrating temperature of about 120° C. to about 20° C. over a period of about 3 to 5 hours. This procedure results in the formation of a coarsely granular precipitate which will filter rapidly.

The cooled batch is then blown through a filter press by gas pressure. It should best not be pumped through because the pump agitation may disperse the soap granules and slow up the filtration. An inert gas, such as nitrogen, should preferably be used in this step as well as in all others throughout the process, since exposure of the constituents of black liquor soap to air or oxygen causes rapid oxidation resulting in darkening of the products. A weight of fresh, dry secondary amyl alcohol equal to the original amyl alcohol charge is forced through the press after the slurry to wash the rosin-containing liquors from the fatty acid soap cake. In a plate and frame press of the "through washing" design, this proportion of wash liquor is sufficient to reduce the rosin acid concentration to about 1 to 2% in the fatty acids prepared from the filter cake. As the cake in the press retains 50 to 60% of its weight of liquor containing, before washing, about 15% of rosin acids, thorough washing is desirable for a good separation of the fatty acid and rosin acid constituents.

The secondary amyl alcohol filtrate from the fatty acid soap filter cake is charged into a lead-lined still and treated with an excess of concentrated sulphuric acid, beyond that necessary to neutralize its total alkalinity so that the whole batch contains about 0.25% free $H_2SO_4$. To prevent charring, this concentrated $H_2SO_4$ should be added as a cooled solution in 4 volumes of dry amyl alcohol. Two-thirds to three-fourths of the secondary amyl alcohol can then be directly distilled off as dry alcohol with 40–50 pounds steam pressure in the still coils. This dry amyl alcohol may be used as wash liquor for the fatty acid soap filter cake. The excess sulphuric acid in the boiling dry amyl alcohol solution serves a dual purposes: (1) it catalyzes the preferential esterification of any residual traces of fatty acids with the amyl alcohol so that these fatty acids can be recovered as esters along with the unsaponifiable fat and so do not contaminate the rosin acids; (2) it catalyzes the transformation of "amorphous" resinic acids to crystallizable abietic acid.

The residue from this direct distillation is cooled and an equal volume of cold water or cold sodium sulphate solution is added with good agitation so as to extract and dilute the free sulphuric acid. The residual secondary amyl alcohol is then completely steam distilled out of the batch, leaving abietic acid, unsaponifiable fat and fatty acid esters. The cooling and dilution with cold water are necessary to prevent rehydrolysis of the fatty acid esters formed under the anhydrous conditions.

The rosin acid residue left from the amyl alcohol removal is denser than water and will make up the bottom layer in the still. Petroleum naphtha, of boiling rang 90°–130° C., and in an amount equal to the weight of secondary amyl alcohol in the original charge, is added to the warm residue with vigorous agitation. This dissolves and floats the rosin residue after which the aqueous layer is allowed to settle and is drawn off. The free rosin acids are then extracted from the naphtha solution in an iron tank with aqueous 4% NaOH. The amount of 4% NaOH should be rather closely controlled to avoid emulsification. At 25°–26° C. the limits are 1.6 to 1.7 times that corresponding to the acid value of the naphtha solution. After thorough agitation the mixture is allowed to settle at 25°–26° C., the naphtha solution forming the upper layer and the aqueous rosin-alkali solution forming the lower layer. These layers are separated and further treated as described below.

The naphtha solution obtained in the separation is washed once with one-fourth its volume of aqueous 1% NaOH. The wash liquid is added to the rosin-alkali solution. The washed naphtha solution may be transferred to an iron still and the naphtha recovered by distillation. The still residue of neutral fat is an amber oil with a slight sweet odor. The amount obtained is about 12–15% of the talloel taken, this amount and also the composition of the material depending upon the completeness of the previous fatty acid soap precipitation. The following table gives the range of characteristics of this material.

TABLE

Characteristics of neutral fat

| | |
|---|---|
| Amyl esters of fatty acids_____per cent__ | 30–40 |
| Amyl esters of rosin acids_____do____ | 5–10 |
| Hydrocarbons _____do____ | 20–30 |
| Sterols _____do____ | 30–40 |
| Acid value_____ | 2–5 |
| Saponification value_____ | 80–120 |
| Iodine value_____ | 130–160 |

This neutral fat serves as a relatively high concentration of phytosterols, and these can be concentrated still more by saponification of this neutral fat with caustic and extraction of the phytosterols along with the hydrocarbons. The separation of the phytosterols from the hydrocarbons can be accomplished by fractional crystallization or other known methods.

The portion of the neutral fat referred to as esters of fatty acids is primarily esters of unsaturated fatty acids, principally linoleic and linolenic, together with some smaller amount of esters of palmitic acid. In view of the general unsaturated nature of these esters, they are easily sulfonated. The sulfonated products find many uses in the treatment of leather, textiles and the like. The sterols may be used in organic syntheses, including the preparation of pharmaceutical compounds, lanolin substitutes, etc.

In place of secondary amyl alcohol we may use other solvents, such as isopropyl, secondary butyl, tertiary butyl, and tertiary amyl alcohols, hexyl alcohols, cyclohexanol, as well as various mixtures of these solvents with each other or with suitable proportions of other materials such as with very small amounts of methyl and ethyl alcohols or the like. Likewise, other suitable acids may be used in place of sulphuric.

In the recovery of the rosin acids as rosinates described specifically with the use of 4% NaOH solution, I have found that other alkalis and ratios may be employed. The temperature of the rosinate solution affects, to some extent, the choice of the strength of the alkali solution as well as the amount used in excess but, in general, I prefer to use an aqueous alkali solution containing about 2–5% alkali, by weight, and in an amount equivalent to about 1.1–2.0 times that corresponding to the acid value of the naphtha solution.

Instead of starting with black liquor soap, I may use unrefined, semi-refined or refined talloel to obtain the desired results and the use of such materials is included in the present process.

It will be apparent that the present invention is susceptible to many variations and changes other than those noted, the latitude of change and scope of invention being limited only as defined in the appended claims.

I claim:

1. In a process of separating the fatty acid soaps of black liquor soap from the rosin acids by forming a hot, substantially anhydrous solution of fatty acids, rosin acids and an amount of alkali sufficient to neutralize only the fatty acids in an alcoholic organic solvent in which the alkali soaps of the fatty acids are soluble hot but not cold, and in which the rosin acids are soluble hot and cold, and, after cooling said solution to precipitate the soaps of the fatty acids which are then separated from the mother liquor, the steps which comprise adding to the mother liquor sulphuric acid diluted with anhydrous alcoholic organic solvent in an amount about 0.25% in excess of that required to neutralize the alkalinity of the mother liquor, thereby setting free residual fatty acids contained therein, heating the acidified mother liquor to esterify residual fatty acids with the anhydrous alcoholic organic solvent and to isomerize rosin acids to crystallizable forms, removing the solvent by distillation, extracting the rosin acids, unsaturated fatty acid esters, hydrocarbons and sterols from the still residue with naphtha, adding to the resulting naphtha solution dilute aqueous alkali in an amount 1.1–2.0 times that equivalent to the acid present, separating the naphtha solution from the aqueous rosinate solution by gravity separation, and heating the naphtha solution from the last-named separation to distill off the naphtha and leave a residue containing sterols and esters of unsaturated fatty acids.

2. In a process of separating the fatty acid soaps of black liquor soap from the rosin acids by forming a hot, substantially anhydrous solution of fatty acids, rosin acids and an amount of alkali sufficient to neutralize only the fatty acids in secondary amyl alcohol in which the alkali soaps of the fatty acids are soluble hot but not cold, and in which the rosin acids are soluble hot and cold, and, after cooling said solution to precipitate the soaps of the fatty acids which are then separated from the mother liquor, the steps which comprise adding to the mother liquor sulphuric acid diluted with anhydrous alcoholic organic solvent in an amount about 0.25% in excess of that required to neutralize the alkalinity of the mother liquor, thereby setting free residual fatty acids contained therein, heating the acidified mother liquor to esterify residual fatty acids with the anhydrous alcoholic organic solvent and to isomerize rosin acids to crystallizable forms, removing the unesterified alcohol by distillation, washing the still residue with cool water to remove salts and excess acid, extracting the rosin acids, unsaturated fatty acid esters, hydrocarbons and sterols from the still residue with naphtha, adding to the resulting naphtha solution a 4% aqueous sodium hydroxide solution in an amount about 1.6 times that equivalent to the acid present, separating the naphtha solution from the aqueous rosinate solution by gravity separation, heating the naphtha solution from the last-named separation to distill off the naphtha and leave a residue containing sterols, hydrocarbons and esters of unsaturated fatty acids, saponifying said residue last mentioned with an alkali, extracting the sterols and hydrocarbons from the resulting mixture and separating the sterols from the hydrocarbons so extracted.

ALFRED G. HOUPT.

REFERENCES CITED

The following references are of record in the file of this patent:

UNITED STATES PATENTS

| Number | Name | Date |
| --- | --- | --- |
| 1,940,372 | Sandquist | Dec. 19, 1933 |
| 2,285,902 | Christmann et al. | June 9, 1942 |

OTHER REFERENCES

Hasselstroem, Paper Trade Journal, 55th year, July 8, 1926.